United States Patent
Cretteur et al.

(10) Patent No.: US 10,919,117 B2
(45) Date of Patent: Feb. 16, 2021

(54) HOT-FORMED PREVIOUSLY WELDED STEEL PART WITH VERY HIGH MECHANICAL RESISTANCE AND PRODUCTION METHOD

(75) Inventors: Laurent Cretteur, Gouvieux (FR); Qingdong Yin, Montataire (FR); Francis Schmit, Clermont (FR); Wolfram Ehling, Ghent (BE)

(73) Assignee: ARCELORMITTAL INVESTIGACIÓN Y DESARROLLO, S.L., Sestao (ES)

( * ) Notice: Subject to any disclaimer, the term of this patent is extended or adjusted under 35 U.S.C. 154(b) by 1944 days.

(21) Appl. No.: 14/235,420

(22) PCT Filed: Jul. 23, 2012

(86) PCT No.: PCT/IB2012/001418
§ 371 (c)(1),
(2), (4) Date: Sep. 10, 2014

(87) PCT Pub. No.: WO2013/014512
PCT Pub. Date: Jan. 31, 2013

(65) Prior Publication Data
US 2015/0030382 A1    Jan. 29, 2015

(30) Foreign Application Priority Data
Jul. 26, 2011 (WO) .................. PCT/IB2011/001725

(51) Int. Cl.
*B23K 31/02* (2006.01)
*B23K 26/32* (2014.01)
(Continued)

(52) U.S. Cl.
CPC .............. *B23K 31/02* (2013.01); *B23K 26/32* (2013.01); *B23K 26/60* (2015.10);
(Continued)

(58) Field of Classification Search
None
See application file for complete search history.

(56) References Cited

U.S. PATENT DOCUMENTS 3,989,919 A  11/1976 Wefers et al.
4,902,872 A   2/1990 Frings
(Continued)

FOREIGN PATENT DOCUMENTS

CN    101104225 A    1/2008
DE    102007015963 A1  10/2008
(Continued)

OTHER PUBLICATIONS

Saf, Safdual Zn "Fiche de Donnees de Securite", Dec. 12, 1999, see English translation.
(Continued)

*Primary Examiner* — Daniel J. Schleis
(74) *Attorney, Agent, or Firm* — Davidson, Davidson & Kappel, LLC

(57) ABSTRACT

The invention relates principally to a welded steel part with a very high mechanical strength characteristics obtained by heating followed by hot forming, then cooling of at least one welded blank obtained by butt welding of at least one first and one second sheet consisting at least in part of a steel substrate and a pre-coating which is constituted by an intermetallic alloy layer in contact with the steel substrate, topped by a metal alloy layer of aluminum or aluminum-based alloy.

Figure 1:
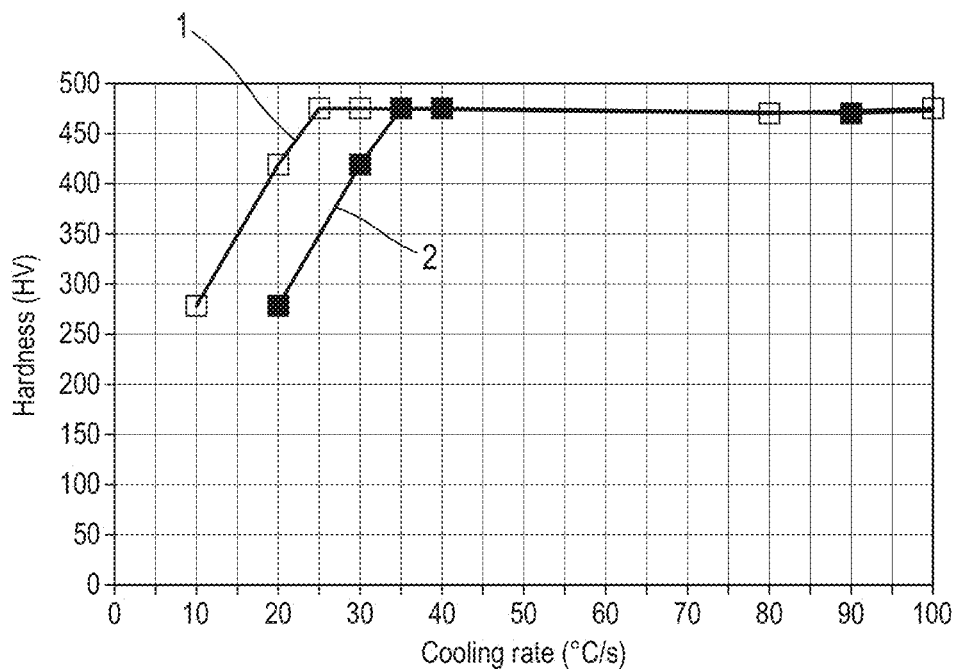

This welded steel part claimed by the invention is essentially characterized in that the metal alloy layer (19, 20) has been removed from the edges (36) in direct proximity to the weld metal zone (35), while the intermetallic alloy layer (17, 18) has been left in place, and in that over at least a portion of the length of the weld metal zone (35), the ratio between the carbon content of the weld metal zone (35) and the carbon (Continued)

content of the substrate (25, 26) of either the first or the second sheet (11, 12) having the higher carbon content (Cmax) is between 1.27 and 1.59.

The invention likewise relates to a method for the fabrication of a welded steel part as well as the use of this welded steel part for the fabrication of structural or safety parts for automotive vehicles.

11 Claims, 5 Drawing Sheets

(51) Int. Cl.
| | |
|---|---|
| B23K 26/60 | (2014.01) |
| B23K 35/30 | (2006.01) |
| B23K 35/38 | (2006.01) |
| B23K 35/02 | (2006.01) |
| B32B 15/01 | (2006.01) |
| C21D 9/48 | (2006.01) |
| C21D 9/50 | (2006.01) |
| C21D 1/673 | (2006.01) |
| C22C 38/04 | (2006.01) |
| C22C 38/18 | (2006.01) |
| C23C 28/02 | (2006.01) |
| B23K 101/34 | (2006.01) |
| B23K 103/08 | (2006.01) |
| B23K 103/00 | (2006.01) |

(52) U.S. Cl.
CPC ...... *B23K 35/0261* (2013.01); *B23K 35/3053* (2013.01); *B23K 35/3073* (2013.01); *B23K 35/383* (2013.01); *B32B 15/012* (2013.01); *C21D 1/673* (2013.01); *C21D 9/48* (2013.01); *C21D 9/50* (2013.01); *C21D 9/505* (2013.01); *C22C 38/04* (2013.01); *C22C 38/18* (2013.01); *C23C 28/021* (2013.01); *C23C 28/023* (2013.01); *B23K 2101/34* (2018.08); *B23K 2103/08* (2018.08); *B23K 2103/50* (2018.08); *C21D 2211/001* (2013.01); *C21D 2211/008* (2013.01); *C21D 2221/01* (2013.01); *C21D 2221/02* (2013.01); *C21D 2251/02* (2013.01); *Y10T 403/479* (2015.01)

(56) References Cited

U.S. PATENT DOCUMENTS

| | | | |
|---|---|---|---|
| 5,344,062 A | 9/1994 | Krengel | |
| 6,290,905 B1 | 9/2001 | Watanabe et al. | |
| 6,296,805 B1 | 10/2001 | Laurent et al. | |
| 7,241,971 B2* | 7/2007 | Bonnet | B23K 26/1429 219/121.64 |
| 7,431,197 B2 | 10/2008 | Franchet et al. | |
| 7,799,148 B2 | 9/2010 | Scott et al. | |
| 8,307,680 B2 | 11/2012 | Drillet et al. | |
| 8,471,173 B2 | 6/2013 | Miessbacher et al. | |
| 8,555,507 B2 | 10/2013 | Lee et al. | |
| 8,614,008 B2* | 12/2013 | Canourgues | B23K 9/23 428/542.8 |
| 9,321,132 B2 | 4/2016 | Briand et al. | |
| 9,597,750 B2 | 3/2017 | Canourgues et al. | |
| 9,616,527 B2 | 4/2017 | Briand | |
| 9,630,275 B2 | 4/2017 | Chen et al. | |
| 9,676,061 B2 | 6/2017 | Canourgues et al. | |
| 9,901,969 B2 | 2/2018 | Miyazaki et al. | |
| 2008/0011720 A1 | 1/2008 | Briand | |
| 2009/0220815 A1* | 9/2009 | Canourgues | B23K 9/23 428/583 |
| 2010/0047619 A1 | 2/2010 | Jung | |
| 2010/0221572 A1 | 9/2010 | Laurent et al. | |
| 2013/0098878 A1 | 4/2013 | Briand et al. | |
| 2013/0236239 A1 | 9/2013 | Brandt et al. | |
| 2015/0030382 A1 | 1/2015 | Cretteur et al. | |
| 2015/0043962 A1 | 2/2015 | Miyazaki et al. | |

FOREIGN PATENT DOCUMENTS

| | | |
|---|---|---|
| DE | 202007018832 U | 9/2009 |
| DE | 102008027167 | 12/2009 |
| DE | 102010019258 A1 | 11/2011 |
| EP | 0279866 A1 | 8/1988 |
| EP | 0502390 A1 | 9/1992 |
| EP | 0971044 | 1/2000 |
| EP | 1878531 | 1/2008 |
| EP | 2007545 | 12/2008 |
| JP | H0557468 A | 3/1993 |
| JP | H0741842 | 2/1995 |
| JP | 2002219589 A | 8/2002 |
| JP | 2004090045 A | 3/2004 |
| JP | 2006021224 A | 1/2006 |
| JP | 2006218518 A | 8/2006 |
| JP | 2007038269 A | 2/2007 |
| JP | 2007154257 | 6/2007 |
| JP | 2007175775 | 7/2007 |
| JP | 2008189987 A | 8/2008 |
| JP | 2011025900 A | 2/2011 |
| JP | 5316670 | 10/2013 |
| JP | 2013220445 A | 10/2013 |
| KR | 100551797 B1 | 2/2006 |
| KR | 20090005004 A | 1/2009 |
| KR | 20090086970 A | 8/2009 |
| KR | 20100085610 A | 7/2010 |
| KR | 101035753 B1 | 5/2011 |
| KR | 101327648 B1 | 11/2013 |
| RU | 2155655 | 9/2000 |
| RU | 2361931 | 2/2009 |
| RU | 2355541 | 5/2009 |
| RU | 2373037 | 11/2009 |
| RU | 2389803 | 5/2010 |
| WO | WO0234456 | 5/2002 |
| WO | WO2005107996 | 11/2005 |
| WO | WO2007118939 | 10/2007 |
| WO | WO2010068804 | 6/2010 |
| WO | 2011138278 A1 | 11/2011 |
| WO | WO2011138278 | 11/2011 |
| WO | 2012007664 A1 | 1/2012 |

OTHER PUBLICATIONS

Liste der Legierungselemente, Wikipedia, Mar. 25, 2011, see English translation.

Maas, Joerg and Werner Staudinger. "Tailored Blanks in Hot Stamping." Dusseldorf: Thyssenkrupp Techforum, 2008. pp. 28-31. XP-001519906. ISSN 1612-2771.

Uchihara: Joining Technologies for Automotive Steel Sheets, Welding International, vol. 25, No. 4, Apr. 2011, pp. 249-259, selected from Journal of Japan Welding Society, 2008 77(8) pp. 722-730.

Dossett et al: "Fundamentals of the Heat Treating of Steel", Practical Heat Treating, Second Edition, Mar. 1, 2006.

What is a tailored blank, http://automotive.arcelormittal.com/tailoredblanks/1828/1832, Dec. 2015.

Tailor Welded Blanks for Advanced Manufacturing, 1st Edition (2011), Abstract.

The Future of Automaking: Tailor Welded Blanks, Welding Design, Feb. 1, 2004, http://weldingdesign.com/consumables/future-automaking-tailor-welded-blanks.

Matthes et al.: Schweisstechnik: Schweissen von metallischen Konstruktionswerkstoffen), 3 Edition, Feb. 2, 2006, 9 pages, see English translation, 15 pages.

"Aufkohlen", Wikipediua Article of Jul. 2, 2011, see English translation.

Salminen, A., The Effects of Filler Wire Feed on the Efficiency of Laser Welding, Proceedings of International Congress on Laser Advanced Materials Processing LAMP2002. May 27-31, 2002 Osaka, The International Society tor Optics and Photonics, p. 263-268.

(56) References Cited

OTHER PUBLICATIONS

Dawes: "Laser Welding—A practical guide", Abington Publishing, p. 152, first published in 1992.
Arata et al: "High Power CO2 Laser Welding of Thick Plate: Multipass Welding with Filler Wire", Welding Ph sics Process & Instrument, Dec. 1986.
"UTP A DUR 350", dated Aug. 2010 and English translation.

* cited by examiner

HOT-FORMED PREVIOUSLY WELDED STEEL PART WITH VERY HIGH MECHANICAL RESISTANCE AND PRODUCTION METHOD

This invention relates principally to a very high-strength hot-formed welded steel part.

The invention likewise relates to a method for the fabrication of a welded steel part as well as the use of this welded steel part for the fabrication of structural or safety parts for automotive vehicles.

The prior art discloses methods for the fabrication of welded steel parts from steel blanks of different compositions and/or thicknesses that are continuously butt-welded to one another. In a first known fabrication mode, these welded blanks are cold-formed. In a second known fabrication mode, these welded blanks are heated to a temperature that makes possible the austenitization of the steel and are then hot-formed and rapidly cooled in the forming die. This invention relates to this second fabrication mode.

The composition of the steel can be selected both to make possible subsequent heating and forming operations and to give the welded steel part high mechanical strength, high impact strength and good corrosion resistance.

Steel parts of this type are used in particular in the automobile industry, and more particularly for the fabrication of anti-intrusion parts, structural parts or parts that contribute to the safety of automotive vehicles.

Among the hot-formable materials that have the characteristics required for the above-mentioned applications, coated steel sheet described in publication EP971044 has in particular a carbon content of between 0.10% and 0.5% by weight and includes an aluminum-based metal pre-coating. This sheet is coated, for example by continuous dip coating, in a bath containing, in addition to aluminum, silicon and iron in controlled concentrations. The subsequent heat treatment applied during a hot-forming process or after the forming and cooling carried out after this heat treatment makes it possible to obtain a martensitic microstructure that gives the steel part a high mechanical strength which can exceed 1500 MPa.

A known method for the fabrication of welded steel parts consists of procuring at least two steel sheets as described in publication EP 971044, butt welding these two sheets to obtain a welded blank, optionally cutting this welded blank, then heating the welded blank before performing a hot forming operation, for example by hot stamping, to impart to the steel part the shape required for its application.

One known welding technology is laser beam welding. This technology has advantages in terms of flexibility, quality and productivity compared to other welding technologies such as seam welding or arc welding.

During the welding operation, however, the aluminum-based pre-coating consisting of an intermetallic alloy layer which is in contact with the steel substrate, topped by a layer of metal alloy, is diluted with the steel substrate within the weld metal zone, which is the zone that is in the molten state during the welding operation and which solidifies after this welding operation, forming the bond between the two sheets.

In the range of aluminum contents of the pre-coating, two phenomena can occur.

In a first phenomenon, if the aluminum content in the weld metal zone is locally high, intermetallic compounds are formed, resulting from the dilution of a portion of the pre-coating inside the weld metal zone, and the formation of an alloy which occurs during the subsequent heating of the welded joint before the hot forming step. These intermetallic compounds are sites where incipient cracking is most likely to occur.

In the second phenomenon, if the aluminum content in the weld metal zone is lower, the aluminum, which is an alphagene element in solid solution in the matrix, prevents the transformation into austenite which occurs during the step preceding the stamping. Consequently, it is no longer possible to obtain martensite or bainite during the cooling after the hot forming and the welded seam contains ferrite. The weld metal zone then exhibits a hardness and mechanical strength which are less than those of the two adjacent sheets.

To prevent the first phenomenon described above, publication EP2007545 describes a solution which consists of eliminating, at the level of the periphery of the sheets destined to be subjected to the welding operation, the superficial layer of metal alloy, leaving the layer of intermetallic alloy. The removal can be performed by brushing or by laser beam. The intermetallic alloy layer is preserved to guarantee the corrosion resistance and to prevent the phenomena of decarburization and oxidation during the heat treatment that precedes the forming operation.

However, this technology does not always make it possible to prevent the second phenomenon described above: although the dilution of the thin intermetallic alloy layer results in only a very slight increase in the aluminum content in the weld metal zone (less than 0.1%), the conjugation of local aluminum segregations and the potential combination of boron in the form of nitride in the weld metal zone results in a decrease in the hardenability in this zone. Therefore, the critical hardening rate is increased in the weld metal zone compared to the rate in the two adjacent sheets.

FIG. 1 illustrates the hardness observed in the weld metal zone (profile 2) and in the base metal (profile 1), i.e. the neighboring steel sheet, after heating to 900° C., followed by hot stamping and cooling at a variable rate. The hardness of the base metal is the hardness obtained in the case of a sheet described in publication EP971044, which contains in particular 0.22% C, 1.12% Mn and 0.003% B. The hardness of the weld metal zone is the hardness observed when the welding is performed as described in publication EP2007545.

Profile 1 indicates that the critical martensitic hardening rate of the base metal is 27° C./second because any cooling rate greater than 27° C./second results in a hardness of the sheet on the order of 480 HV and a totally martensitic microstructure.

On the other hand, profile 2 shows that the martensitic critical hardening rate of the weld metal zone is 35° C./s. Therefore, a cooling rate after hot stamping between 27° C./second and 35° C./second will not result in a sufficient hardness and a fully martensitic structure in this zone.

In addition, this increase in the critical hardening rate in the weld metal zone is accompanied by unfavorable cooling conditions in this weld metal zone during the hot forming.

In fact, it is possible that the weld metal zone may lose contact completely with the cold die during the cooling for the reasons indicated below, considered independently or in combination:

if the two sheets are of different thicknesses, on account of the "step" designed in the die to make possible the displacement of the material during the forming
  on account of a possible misalignment between the die and the welded blank.

Therefore, on the basis of the information provided above, for a cooling rate of the welded blank of less than 35°

C./second, the weld metal zone exhibits a heterogeneous microstructure and a decrease in the mechanical characteristics of the joint, which can render the welded steel part unsuitable for the intended applications, in particular for the automobile industry.

Another known welding method applied to the sheets described in publication EP971044 is described in publication EP1878531.

This method consists of creating a weld metal zone that exhibits the required mechanical strength characteristics for the welding of two sheets previously cut by shearing which, on account of this type of cutting, exhibit aluminum-based pre-coating deposits on their cut edges.

The welding method consists either of hybrid laser-TIG welding, i.e. a laser beam combined with an electric arc generated by a TIG welding torch ("Tungsten Inert Gas") equipped with a non-fusible electrode, or hybrid laser-MIG ("Metal Inert Gas") welding for which the welding torch is equipped with a fusible wire electrode.

However, the steel parts hot stamped after the welding operation using this method also exhibit mechanical brittleness at the level of the weld metal zone.

In fact, regardless of the proportion of filler metal in the case of laser-MIG welding, the mixing in the welded metal zone is not sufficient to prevent the formation of zones with a high concentration of aluminum, which results in the absence of formation of martensite at the level of the weld metal zone during cooling and thus insufficient mechanical strength.

To obtain a desired level of dilution, it is necessary to add large amounts of filler metal, which on one hand creates problems melting the metal added by the welding with the metal to be welded, and on the other hand a large excess thickness at the level of the weld metal zone which is undesirable for the forming process and the resulting part to be welded is unable to meet the quality standards in effect in the automobile sector.

In this context, the object of this invention is a welded steel part that has very high mechanical strength, i.e. greater than 1230 MPa, obtained by heating in the austenitic range followed by the deformation of at least one welded blank obtained by butt welding of at least two sheets consisting at least in part of a steel substrate and a pre-coating which consists of an intermetallic alloy layer which is in contact with the steel substrate, topped by a layer of metal alloy which is an aluminum or aluminum-based alloy.

A particular object of the invention is a welded steel part of the type described above for which the prior deformation consists of hot forming and for which the mechanical strength of the weld metal zone is greater than that of the two welded sheets or of at least one of the two welded sheets.

For this purpose, the welded steel part with very high mechanical strength characteristics obtained by the invention is obtained by heating in the austenitic range followed by hot forming, then cooling, of at least one welded blank obtained by butt welding of at least a first and a second sheet which consist at least in part of a steel substrate and a pre-coating which is constituted by an intermetallic alloy layer in contact with the steel substrate, topped by a metal alloy layer of an aluminum or aluminum-base alloy, and is essentially characterized in that the the metal alloy layer is removed from the edges in direct proximity to the weld metal zone resulting from the welding operation and constituting the bond between the first and second sheets, while the intermetallic alloy layer is retained, and in that, over at least a portion of the weld metal zone, the ratio between the carbon content of the weld metal zone and the carbon content of the substrate of the first or second sheet, whichever has the highest carbon content Cmax, is between 1.27 and 1.59.

The above mentioned characteristics of the welded steel part claimed by the invention are translated by a fracture that occurs in the base metal and not in the weld metal zone when the weld joint is subjected to a uniaxial tensile stress perpendicular to the joint.

The welded steel part claimed by the invention can also have the optional characteristics described below, considered individually or in all possible technical combinations:

the ratio between the hardness of the weld metal zone and the hardness of the substrate of the first or second sheet that has the higher carbon content Cmax is greater than 1.029+ (0.36 Cmax), where Cmax is expressed in percent by weight.

the composition of the substrate of at least the first or the second sheet includes the following elements, expressed in percent by weight:
  $0.10\% \leq C \leq 0.5\%$
  $0.5\% \leq Mn \leq 3\%$
  $0.1\% \leq Si \leq 1\%$
  $0.01\% \leq Cr \leq 1\%$
  $Ti \leq 0.2\%$
  $Al \leq 0.1\%$
  $S \leq 0.05\%$
  $P \leq 0.1\%$
  $0.0002\% \leq B \leq 0.010\%$,
the balance being iron and unavoidable impurities from processing.

the composition of the substrate of at least the first or the second sheet includes the following, expressed in percent by weight:
  $0.15\% \leq C \leq 0.4\%$
  $0.8\% \leq Mn \leq 2.3\%$
  $0.1\% \leq Si \leq 0.35\%$
  $0.01\% \leq Cr \leq 1\%$
  $Ti \leq 0.1\%$
  $Al \leq 0.1\%$
  $S \leq 0.03\%$
  $P \leq 0.05\%$
  $0.0005\% \leq B \leq 0.010\%$,
the balance being iron and unavoidable impurities from processing.

the composition of the substrate of at least the first or the second sheet includes the following, expressed in percent by weight:
  $0.15\% \leq C \leq 0.25\%$
  $0.8\% \leq Mn \leq 1.8\%$
  $0.1\% \leq Si \leq 0.35\%$
  $0.01\% \leq Cr \leq 0.5\%$
  $Ti \leq 0.1\%$
  $Al \leq 0.1\%$
  $S \leq 0.05\%$
  $P \leq 0.1\%$
  $0.0002\% \leq B \leq 0.005\%$,
the balance being iron and unavoidable impurities from processing.

the carbon content of the weld metal zone is less than or equal to 0.35% by weight.

the metal alloy layer of the pre-coating contains, expressed in percent by weight, between 8 and 11% silicon, between 2 and 4% iron, with the remainder of the composition consisting of aluminum and unavoidable impurities.

the microstructure of the weld metal zone contains no ferrite.

the microstructure of the weld metal zone is martensitic.

said hot forming of the welded blank is performed by a hot stamping operation.

the respective cut edges of the peripheral edges of the first and second sheets destined to be subjected to the welding operation contain no aluminum or aluminum alloy, the presence of which can result from a previous cutting operation of each of the first and second sheets.

The invention further relates to a method for the fabrication of the welded steel part described above.

For this purpose, according to the method claimed by the invention, at least a first and a second steel sheet are provided, consisting of a steel substrate and a pre-coating which consists of an intermetallic alloy layer in contact with the steel substrate, topped by a metallic alloy layer which is an aluminum or aluminum-based alloy, and in which this metal alloy layer is removed from at least one surface of a portion of a peripheral edge of each of the first and second steel sheets destined to be subjected to the welding operation, leaving in place the intermetallic alloy layer, and the aluminum or aluminum-base alloy, the presence of which can result from a prior cutting operation of each of the first and second sheets, is removed from the respective cut edges of the peripheral edges of the first and second sheets destined to be subjected to the welding operation, then the first and second steel sheets are butt welded at the level of the respective peripheral edges of these first and second steel sheets from which the layer of metal alloy has been removed by means of a laser source and by using a filler metal wire on at least parts of the length of the welded zone, thereby obtaining a welded blank in which the carbon content of the weld metal zone resulting from the welding operation and constituting the bond between the first and second sheets is between 1.27 and 1.59 times the carbon content of the substrate of the sheet that has the higher carbon content, then said welded blank is heated to give it a totally austenitic structure in the welded metal zone, then said welded blank is hot formed and heated to obtain a steel part, then said steel part is cooled at a controlled rate to obtain the specified mechanical strength characteristics.

Figure 8:
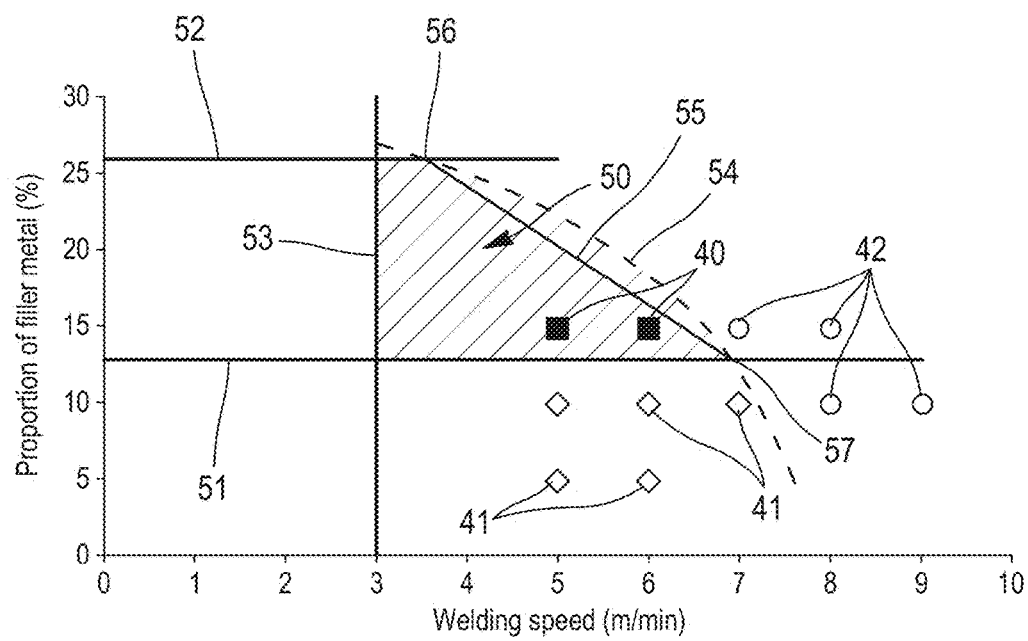

The method for the fabrication of the welded steel part claimed by the invention can also include the optional characteristics described below, considered individually or in all possible technical combinations:

the metal alloy layer is removed from the opposite faces of the respective peripheral edges of each of the first and second steel sheets, leaving the intermetallic alloy layer in place.

the width of the zone from which the metal alloy layer is removed at the level of the peripheral edge of the first and second sheets destined to be subjected to the welding operation is between 0.2 and 2.2 mm.

the composition of the substrate of at least the first or the second sheet includes the following, expressed in percent by weight:
0.10%≤C≤0.5%
0.5%≤Mn≤3%
0.1%≤Si≤1%
0.01%≤Cr≤1%
Ti≤0.2%
Al≤0.1%
S≤0.05%
P≤0.1%
0.0002%≤B≤0.010%,
the balance being iron and unavoidable impurities from processing.

the composition of the substrate of at least the first or the second sheet includes the following, expressed in percent by weight:
0.15%≤C≤0.4%
0.8%≤Mn≤2.3%
0.1%≤Si≤0.35%
0.01%≤Cr≤1%
Ti≤0.1%
Al≤0.1%
S≤0.03%
P≤0.05%
0.0005%≤B≤0.010%,
the balance being iron and unavoidable impurities from processing.

the composition of the substrate of at least the first or the second sheet includes the following, expressed in percent by weight:
0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
0.0002%≤B≤0.005%,
the balance being iron and unavoidable impurities from processing.

during the welding step, the peripheral edges to be welded of the first and second steel sheets are located at a maximum distance of 0.1 mm from one another.

the linear welding energy of the laser source during the welding operation is greater than 0.3 kJ/cm.

the laser source is either of the $CO_2$ gas laser type, which delivers a linear welding energy greater than 1.4 kJ/cm, or of the solid state laser type which delivers a linear welding energy greater than 0.3 kJ/cm.

the welding speed is between 3 meters/minute and 8 meters/minute, and the power of the $CO_2$ gas laser is greater than or equal to 7 kW and the power of the solid state laser is greater than or equal to 4 kW.

the welding step is performed under helium and/or argon cover gas.

the helium and/or argon flow rate during the welding step is greater than or equal to 15 liters per minute.

the filler wire contains the following elements, expressed in percent by weight:
0.6%≤C≤1.5%
1%≤Mn≤4%
0.1%≤Si≤0.6%
Cr≤2%
Ti≤0.2%
the balance being iron and unavoidable impurities from processing.

the filler wire contains the following elements, expressed in percent by weight:
0.65%≤C≤0.75%
1.95%≤Mn≤2.05%
0.35%≤Si≤0.45%
0.95%≤Cr≤1.05%
0.15% Ti≤0.25%
the balance being iron and unavoidable impurities from processing.

the proportion of filler metal relative to the volume of the weld metal zone is between 12% and 26% and the welding speed is between 3 and 7 meters per minute.

the pair consisting of the above proportion of filler metal relative to the volume of the weld metal zone and the welding speed is within the range illustrated in FIG. 8.

the pair consisting of the above proportion of filler metal relative to the volume of the weld metal zone and the welding speed meets the combined requirements listed below:

the proportion of filler metal relative to the volume of the weld metal zone is between 12% and 26% and the welding speed is between 3 and 7 meters per minute, and when the welding speed is greater than 3.5 meters per minute, the pair consisting of the proportion of filler metal relative to the volume of the weld metal zone (35) and the welding speed is such that Y≤−3.86X+39.5, whereby Y designates the proportion of filler metal expressed as a volume percentage and X designates the welding speed expressed in meters per minute.

the proportion of filler metal relative to the volume of the weld metal zone (35) is between 14 and 16%, the helium and/or argon flow rate is between 13 and 17 liters per minute, the diameter at the point of impact on the sheet of the laser beam (30) is between 500 and 700 μm, and the extremity (32a) of the filler wire (32) is at a distance from the point of impact of the laser beam on the sheet of between 2 and 3 mm.

the cooling rate of the weld metal zone (35) during the hot forming step is greater than or equal to the critical martensitic hardening rate of the weld metal zone (35).

Finally, the invention relates to the utilization of the steel parts described above for the fabrication of structural or safety parts for vehicles, in particular automotive vehicles.

Figure 2:
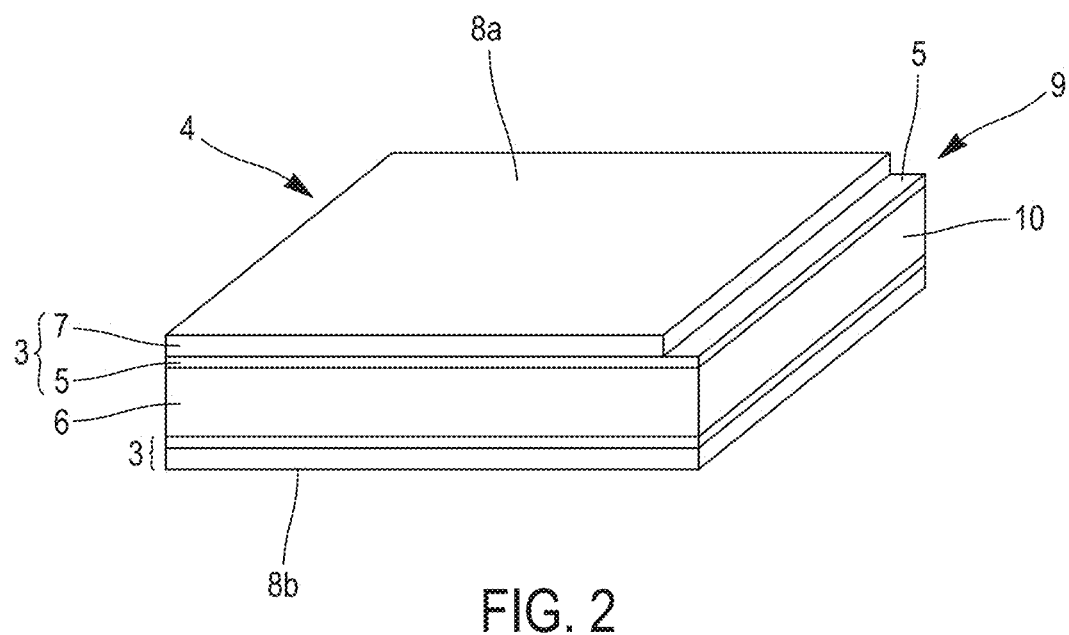
Figure 3:
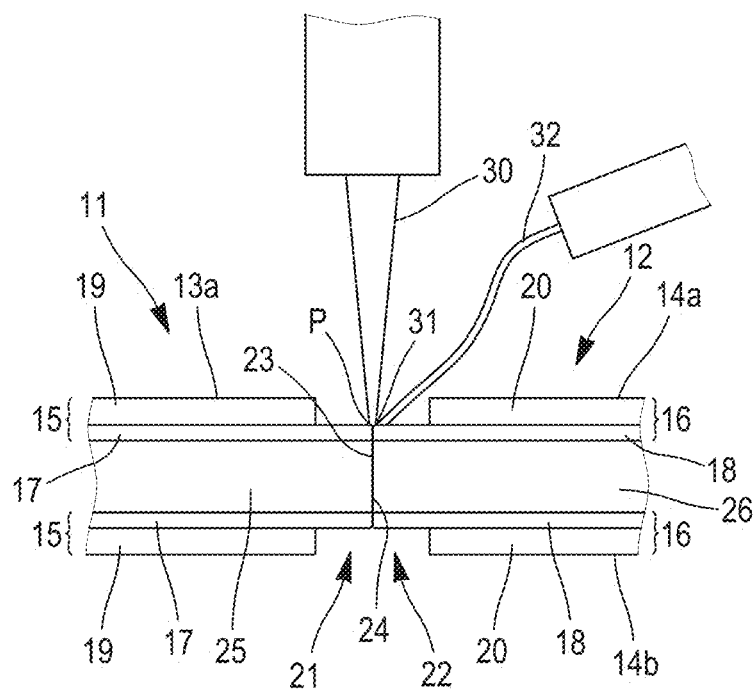
Figure 4:
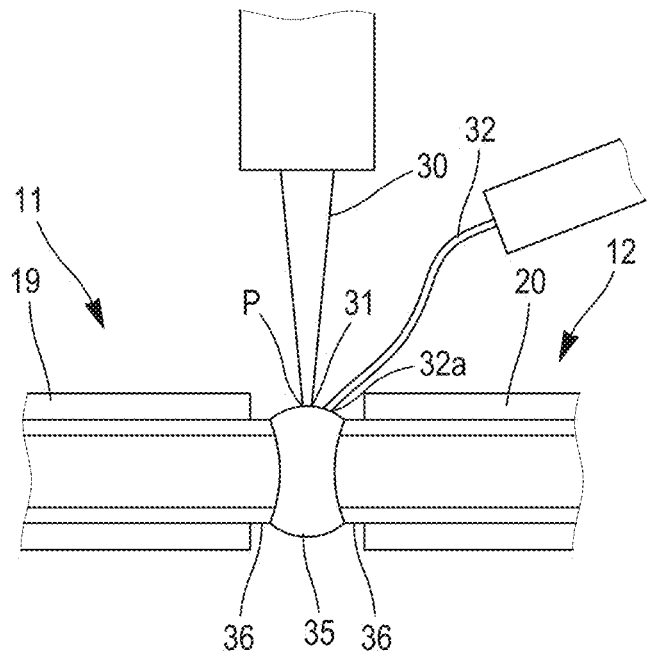
Figure 5:
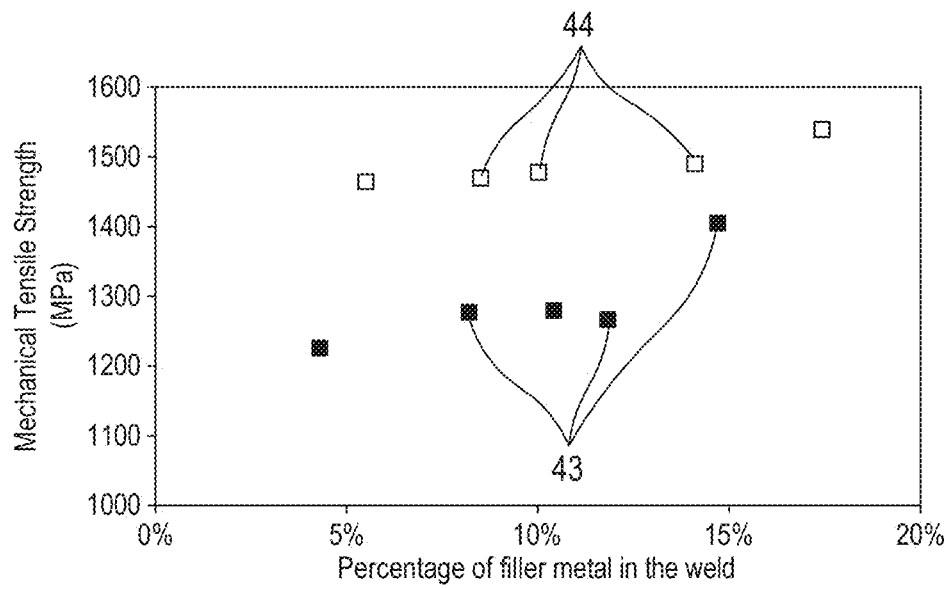
Figure 6:
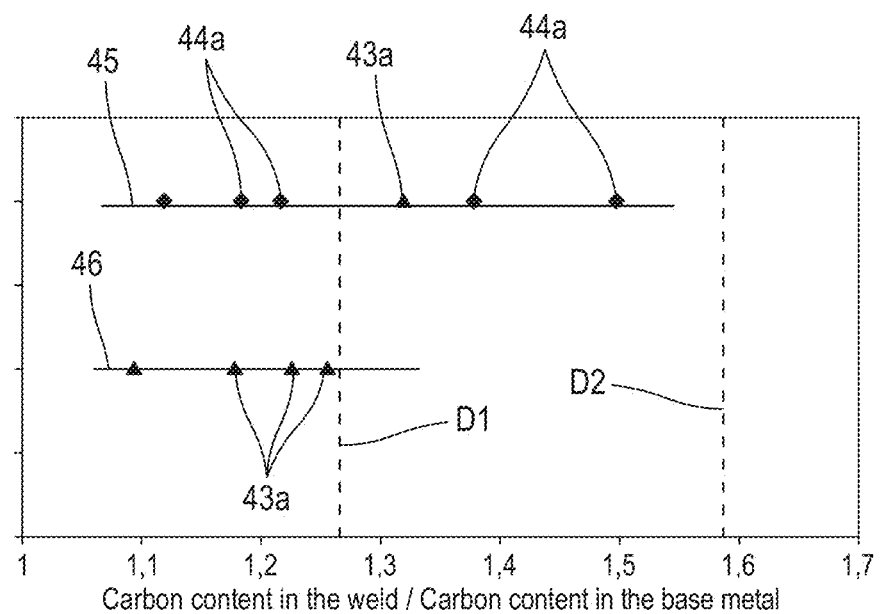
Figure 7:
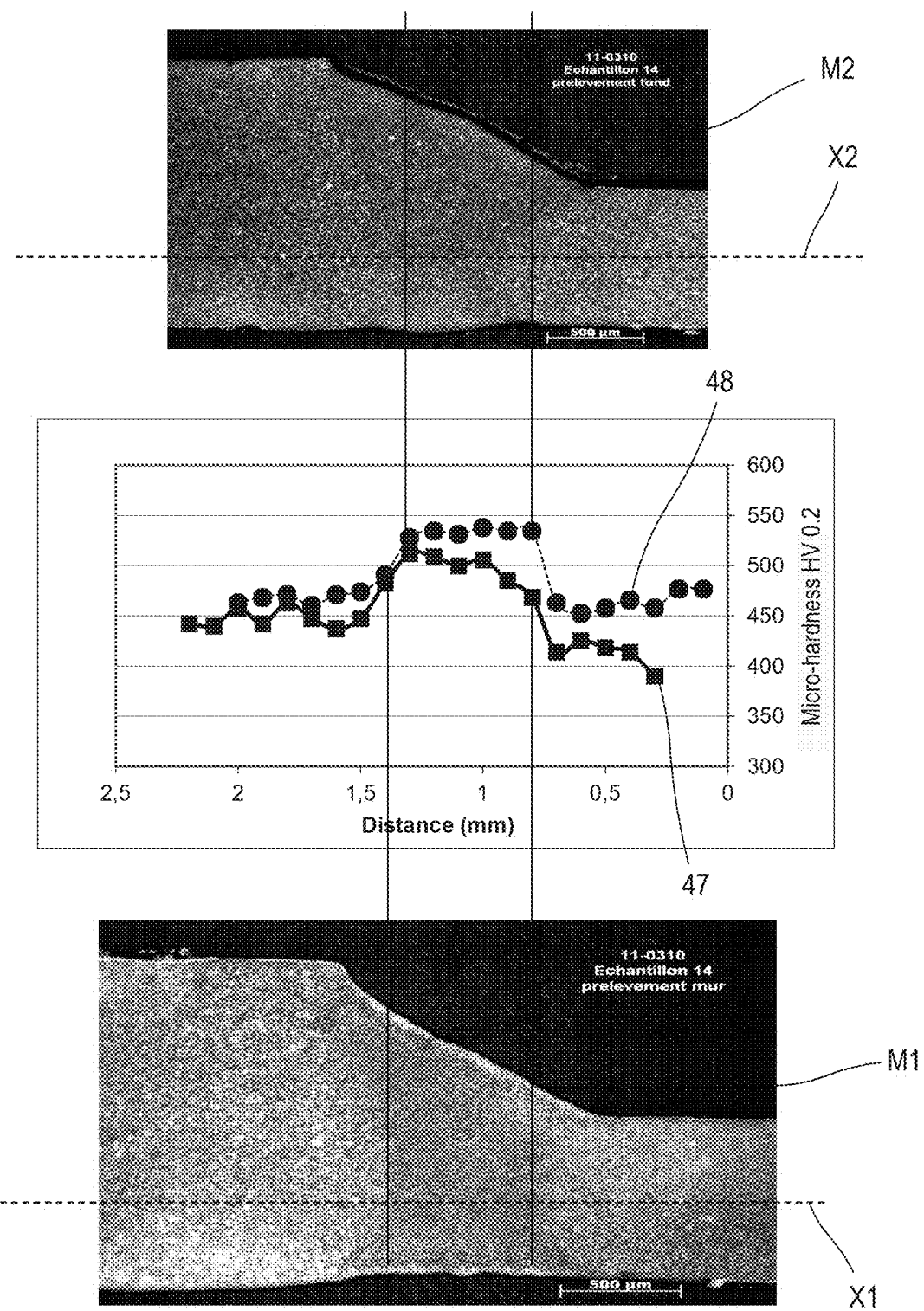

Other characteristics and advantages of the invention are portrayed in detail in the following description, which is presented exclusively by way of example and is in no way intended to be restrictive, with reference to the accompanying figures in which:

FIG. 1 presented above represents the comparative profile of the hardness of the base metal and of the weld metal zone as a function of the cooling rate during the hot stamping, for a welded steel part of the prior art, FIG. 2 is a schematic illustration of the sheet used in the implementation of the method claimed by the invention, FIG. 3 is a schematic illustration of the beginning of the welding operation of the method claimed by the invention, FIG. 4 is a schematic illustration of the end of the welding operation of the method claimed by the invention, FIG. 5 illustrates the profile of the mechanical tensile fracture strength of the weld metal zone, whereby the stress is exerted perpendicularly in relation to the welded joint, as a function of the percentage of filler metal in the weld metal zone during the method claimed by the invention, and for two different cooling rates during the hot stamping, FIG. 6 illustrates the location of the fracture, either in the base metal or in the weld metal zone, as a function of the ratio between the carbon content of the weld metal zone and the carbon content of the base metal, FIG. 7 is a graph that illustrates one example of a micro-hardness profile (hardness under a load of 200 g) of a welded steel part fabricated from two sheets of different thickness and stamped according to the invention and of the zone adjacent to the weld metal zone, and FIG. 8 is a graph illustrating the optimum operating limit conditions of the method claimed by the invention in terms of percentage of filler metal and welding speed.

Figure 9:
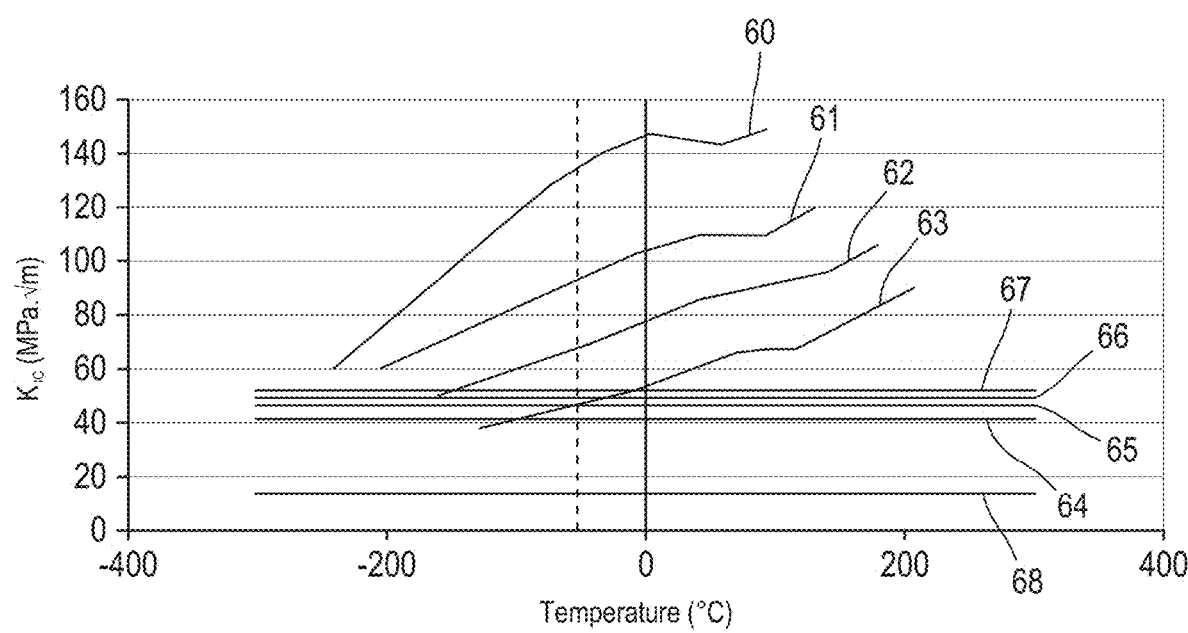

FIG. 9 illustrates the variation of toughness in the weld metal zone as a function of the temperature for different carbon contents.

In the method claimed by the invention, two sheets coated by immersion in a bath of molten aluminum according to a method called continuous "dip coating" as described in publication EP971044 are provided. The term sheet is used in a broad sense as any strip or object obtained by cutting from a strip, coil or sheet.

The aluminum bath which is the object of the dipping operation can also include from 9 to 10% silicon and from 2 to 3.5% iron.

The steel constituting the steel substrate of the sheets exhibits the following composition, expressed in percent by weight:

$0.10\% \leq C \leq 0.5\%$
$0.5\% \leq Mn \leq 3\%$
$0.1\% \leq Si \leq 1\%$
$0.01\% \leq Cr \leq 1\%$
$Ti \leq 0.2\%$
$Al \leq 0.1\%$
$S \leq 0.05\%$
$P \leq 0.1\%$
$0.0002\% \leq B \leq 0.010\%$, the balance being iron and unavoidable impurities from processing.

Preferably, the composition of the steel will be as follows:
$0.15\% \leq C \leq 0.4\%$
$0.8\% \leq Mn \leq 2.3\%$
$0.1\% \leq Si \leq 0.35\%$
$0.01\% \leq Cr \leq 1\%$
$Ti \leq 0.1\%$
$Al \leq 0.1\%$
$S \leq 0.03\%$
$P \leq 0.05\%$
$0.0005\% \leq B \leq 0.010\%$, the balance being iron and unavoidable impurities from processing.

Even more preferably, and in accordance with the following description, the composition of the steel will be as follows:
$0.15\% \leq C \leq 0.25\%$
$0.8\% \leq Mn \leq 1.8\%$
$0.1\% \leq Si \leq 0.35\%$
$0.01\% \leq Cr \leq 0.5\%$
$Ti \leq 0.1\%$
$Al \leq 0.1\%$
$S \leq 0.05\%$
$P \leq 0.1\%$
$0.0002\% \leq B \leq 0.005\%$, the balance being iron and unavoidable impurities from processing.

The sheets to be welded to one another can be of identical or different compositions.

The coating, which will be called the "pre-coating" at this stage in the following description, exhibits the following characteristics resulting from the immersion of the sheet in the aluminum bath: with reference to FIG. 2, the pre-coating 3 of the sheet 4 has two layers 5, 7 of different types.

First, an intermetallic alloy layer 5 of the AlSiFe type is in contact with the surface of the steel substrate 6 of the sheet 4. This intermetallic alloy layer 5 results from the reaction between the steel substrate 6 and the aluminum bath.

In addition, this intermetallic alloy layer 5 is topped by a metal alloy layer 7 which forms a surface layer of the pre-coating 3.

The pre-coating 3 is present on the two opposite faces 8a, 8b of the sheet 4.

In the method claimed by the invention, the metal alloy layer 7 is removed at the level of the periphery 9 of the sheet 4 which is destined to undergo the subsequent welding operation.

In FIG. 2, only the upper surface 8a is the object of this removal, but the metal alloy layer 7 will advantageously be removed peripherally at the level of the two opposite faces 8a, 8b of the sheet 4.

The intermetallic alloy layer 5 therefore remains at the level of the periphery 9 of the sheet 4 which is destined to undergo the welding operation.

The ablation of the metal layer 7 can be performed by a brushing operation because the metal layer 7 which is removed has a hardness which is less than the hardness of the intermetallic alloy layer 5 which remains.

A technician skilled in the art will understand how to adapt the parameters relating to the brushing to make possible the removal of the metal layer 7 on the periphery 9 of the sheet 4.

It is also possible to remove the metal alloy layer using a laser beam directed toward the periphery 9 of the sheet 4.

The interaction between the laser beam and the pre-coating 3 causes a vaporization and an expulsion of the metal alloy layer 7.

The width over which the metal alloy layer 7 at the level of the periphery 9 of the sheet 4 is removed is between 0.2 and 2.2 millimeters.

In addition, the intermetallic alloy layer 5 that remains at the level of the periphery 9 of the sheet 4 is on the order of 5 µm thick.

These two modes of ablation (brushing and laser) of the metal alloy layer are the subject of publication EP2007545.

The previous cutting operations of the sheet 4, as well as the operation of removing the metal alloy layer 7 as described above can involve a portion of the pre-coating 3 at the level of the cut edge 10 of the periphery 9 of the sheet 4 destined to be the object of the welding operation. Therefore there are traces of aluminum or aluminum alloy at the level of this cut edge 10.

According to the method claimed by the invention, these traces of aluminum or aluminum alloy at the level of the cut edge 10 of the sheet 4 are also removed by brushing prior to the welding operation.

With reference to FIG. 3, a first sheet 11 and the second sheet 12, each having a respective substrate 25, 26, and each having on their respective opposite faces 13a, 13b; 14a, 14b a pre-coating 15, 16 consisting of an intermetallic alloy layer 17, 18 topped by a metal alloy layer 19, 20, are placed end to end according to conventional laser welding techniques by contact between their respective peripheries 21, 22, on which on one hand the metal alloy layer 19, 20 has been removed at the level of their opposite faces 13a, 13b; 14a, 14b, and on the cut edges 23, 24 from which the pre-coating 15, 16 deposited during the shearing operation has also been removed.

The maximum distance between the respective cut edges 23, 24 of the two sheets 11, 12 is 0.1 mm, whereby the placement of this clearance between the cut edges 23, 24 of the two sheets 11, 12 promotes the deposit of the filler metal during the welding operation.

As illustrated in FIG. 3, the welding operation according to the method claimed by the invention consists of a laser beam 30 directed at the level of the junction between the two sheets 11, 12, combined with a filler wire 32 that melts at the point of impact 31 of the laser beam. The welding method in question is therefore laser welding with filler metal.

The laser source used must be high-powered and can be selected from among a laser $CO_2$ gas type laser source with a wavelength of 10 micrometers or a solid state laser source with a wavelength of 1 micrometer.

On account of the thickness of the two sheets 11, 12 which is less than 3 mm, the power of the $CO_2$ gas laser must be greater than or equal to 7 kW while the power of the solid state laser must be greater than or equal to 4 kW.

The diameter of the laser beam at the point of its impact on the sheets must be approximately 600 µm for both types of laser source.

Finally, the extremity 32a of the filler wire 32 must be located approximately 3 mm from the point of impact P of the laser beam 30 on the junction between the sheets 11 and 12 for a solid state laser source and approximately 2 mm from the laser beam 30 for a $CO_2$ gas laser type laser source.

These conditions make it possible to obtain a complete melting of the filler wire 32 as well as a satisfactory mixing with the steel substrate at the level of the weld.

In addition, these powers will make it possible to use a welding speed sufficient to prevent the precipitation of boron nitrides and/or other segregation problems.

The filler wire must meet two requirements:

first, the quantity of metal added by this filler wire 32 must be such that the laser source is able to melt it in its entirety and to produce a relatively homogeneous mixture at the level of the weld. In addition, the quantity of metal added must not result in an overthickness of the weld by more than 10% in relation to the lowest thickness of the two sheets if the latter are not the same thickness, in accordance with the quality standards in force in the automobile industry.

the composition of the filler wire must also make it possible, in combination with the other parameters of the welding process, to obtain a weld, the mechanical strength characteristics of which are comparable, after hot forming and cooling, with the mechanical strength characteristics of the first 11 and second 12 welded sheets.

Finally, during the welding step, cover gas protection must be provided to prevent the oxidation and decarburization of the zone which is being welded, to prevent the formation of boron nitride in the weld metal zone and potential cold cracking phenomena caused by the absorption of hydrogen.

This cover gas protection is achieved by using helium and/or argon.

With reference to FIG. 4, the welding operation leads to the formation of a weld metal zone 35 at the junction between the two sheets 11, 12 which subsequently solidifies, thereby forming the weld. The term "weld metal zone" is used to identify this weld even after solidification of this weld metal zone 35.

Measures can be taken for the parts that undergo a less rapid local cooling during the hot forming to add a filler wire only in certain portions of the length of the weld metal zone and not to add the filler metal wire in the remaining joints.

The welded blank 37 resulting from the welding operation therefore has a weld metal zone 35 that does not contain intermetallic alloy because of the prior removal of the metal alloy layer 19, 20 as explained above.

In addition, as illustrated in FIG. 4, the edges 36 in direct proximity to the weld metal zone 35 are free of the metal alloy layer 19, 20 on account of the fact that the width of the weld metal zone 35 is less than the width of the welding zone which does not include a metal alloy layer 19, 20.

Although FIG. 4 illustrates the simple case of a welded blank fabricated from a first sheet 11 and the second sheet 12, it is possible in the method claimed by the invention to use a larger number of sheets which are welded to one another.

The welded blank 37 thereby obtained is then subjected to a heating process to obtain an austenitic transformation in all of the parts of this blank. This blank is then hot formed, preferably by hot stamping. This step is followed by a cooling conducted by contact in the stamping die at a cooling rate which is discussed below, and results in a welded steel part.

In the following description, the reference to a welded steel part refers to the finished piece following the hot stamping of the welded blank, the fabrication of which is described above.

For a type 22MnB5 steel (C=0.20-0.25%, Mn=1.1-1.35%, Si=0.15-0.35%, Al=0.020-0.060%, Ti=0.020-0.050%, Cr=0.15-0.30%, B=0.002-0.004%, the contents being expressed in percent by weight and the balance consisting of iron and the impurities resulting from processing), table 1 below presents the conditions of the welding method used to fabricate a welded steel part for which the hardness of the weld metal and hot-stamped zone is at least equal to the hardness of one or the other of the two sheets 11, 12.

These conditions are indicated in terms of welding speed, volume percentage of the filler metal in relation to the weld metal zone and the chemical composition of the filler wire expressed in percent by weight. The tests that were conducted to determine these boundary conditions were performed with a $CO_2$ gas laser source with a power greater than 7 kilowatts and a solid state laser source with a power greater than 4 kilowatts under a helium and/or argon cover gas at a flow rate greater than 15 liters/minute.

TABLE 1

|  | Welding speed (m/min) | Proportion of filler metal (%) | Composition of the filler wire - % by weight | | | | |
|---|---|---|---|---|---|---|---|
|  |  |  | C | Mn | Si | Cr | Ti |
| Minimum | 3 | 10 | 0.6 | 1 | 0.1 | 0 | 0 |
| Maximum | 8 | 26 | 1.5 | 4 | 0.6 | 2 | 0.2 |

In the framework of another example, tests were conducted with a filler wire having the composition indicated below, in percent by weight: C=0.7%, Si=0.4%, Mn=2%, Cr=1% and Ti=0.2, the remainder consisting of iron and impurities resulting from processing.

The tests that were conducted to determine these boundary conditions were performed with a $CO_2$ gas laser source with a power greater than 7 kilowatts and a solid state laser source with a power greater than 4 kilowatts under a helium and/or argon cover gas at a flow rate greater than 15 liters/minute. All the results obtained and presented below are similar, regardless of the laser source used.

With reference to FIG. 8, the appearance of the weld metal zone and the quality of the mixing of the filler wire and the molten metal are examined for different percentages of filler metal and welding speeds.

For the experimental points identified as references 40 and 41, the results in terms of dilution and surface appearance of the weld metal zone are satisfactory, while for the experimental points identified as 42, the results are not satisfactory.

FIG. 5 illustrates the tensile fracture strength of the hot-stamped welded steel part as a function of the percentage of filler metal in the weld metal zone for two cooling rates of 30 and 50° C. per second.

The experimental points identified as reference 43 correspond to a cooling rate of 30° C. per second and the experimental points identified as reference 44 correspond to a cooling rate of 50° C. per second. These two rates correspond respectively to an efficient extraction of heat thanks to tight contact between the part and the press die (50° C. per second) and to a less tight contact on account of a lower closing pressure and/or a difference in thickness between the sheets to be welded (30° C. per second).

When the hot stamped welded blanks are cooled at a rate of 50° C. per second, the tensile strength is between 1470 and 1545 MPa and the fracture occurs in the base metal.

When the hot stamped welded blanks are cooled at a rate of 30° C. per second, and when the volume proportion of the filler metal is between 4.3 and 11.5%, the fracture occurs in the weld metal zone and the mechanical tensile strength is between 1230 and 1270 MPa.

On the other hand, when the hot stamped welded blanks are cooled at a rate of 30° C. per second, and when the volume proportion of filler metal is 14.7%, the fracture occurs in the base metal with a mechanical strength of 1410 MPa.

Therefore, a proportion of filler metal greater than 12% makes it possible to systematically obtain a fracture outside the welded joint, both in the efficiently cooled zones in the hot stamped part and in the less efficiently cooled zones.

FIG. 6 illustrates the location of the fracture, either in the base metal as indicated on step 45, or in the weld metal zone indicated on step 46, when the welded joints are subjected to a uniaxial tensile force perpendicular to the seam, as a function of the ratio between the carbon content of the weld metal zone and the carbon content of the base metal, starting from the experimental points 43, 44 presented with reference to FIG. 5 and identified respectively as 43a and 44b in FIG. 6.

It has been shown that when this ratio is greater than 1.27 (line D1), the fracture occurs systematically in the base metal, in spite of the modifications of hardenability due to the presence of aluminum in the weld metal zone, and in spite of the slower cooling rate resulting from incomplete contact between the part and the die. FIG. 6 also shows that beyond a ratio of 1.59 (line D2), a particular brittleness occurs.

This maximum ratio of 1.59 between the carbon content of the weld metal zone and the carbon content of the base metal is also obtained by determining the critical conditions that lead to the sudden fracture of a martensitic structure weld comprising a surface defect, when stress is applied perpendicular to the welding direction.

For this purpose, consideration is given to the case of two sheets 11, 12, the thickness w of which is 3 mm, and a slot type defect in the weld metal zone, the depth of which is 10% of the thickness of the sheets 11, 22, i.e. a depth of 0.3 mm.

The expression of the stress intensity factor $K_I$ expressed in MPa$\sqrt{m}$ is as follows:

$$K_I = k\sigma\sqrt{\pi a}$$

in which k is the shape factor, and determined in particular on the basis of the ratio a/w σ is the stress applied to the weld, expressed in MPa, and a is the depth of the defect in question, expressed in meters.

To evaluate the stress intensity factor, a case of severe stress is considered, in which the applied stress σ is equal to the elastic limit Re.

Table 2 below expresses the elastic limit Re and the stress intensity factor $K_I$ for four levels of carbon in the weld metal zone varying between 0.2% and 0.4% for a martensitic microstructure.

TABLE 2

|  | 0.2% C | 0.3% C | 0.35% C | 0.4% C |
| --- | --- | --- | --- | --- |
| Re (MPa) | 1200 | 1350 | 1425 | 1500 |
| $K_I$(MPa√m) | 41.3 | 46.4 | 49.0 | 51.6 |

Reference is made to FIG. 9, which shows the variation of the critical stress intensity factor $K_w$ as a function of the temperature for carbon contents varying between 0.2 and 0.4% and martensitic microstructures. The curve 60 relates to a carbon content of 0.2% C, curve 61 to a carbon content of 0.3% C, curve 62 to a carbon content of 0.35% C and curve 63 to a carbon content of 0.4% C.

This FIG. 9 presents the values of the stress intensity factor $K_I$ expressed in table 2 for each of the levels of carbon content, identified respectively as 64 for a carbon content of 0.2% C, 65 for a carbon content of 0.3%, 66 for a carbon content of 0.35% and 67 for a carbon content of 0.4%.

The risk of sudden fracture of the weld at −50° C. is therefore eliminated when the toughness $K_{IC}$ at this temperature is greater than the stress intensity factor $K_I$.

FIG. 9 shows that this condition is satisfied provided that the carbon content does not exceed 0.35%.

The result is a maximum carbon content in the weld metal zone of 0.35%. Considering a welded joint fabricated from two sheets of type 22MnB5 steel, i.e. containing 0.22% carbon, the limit value of the ratio between the carbon content of the weld metal zone and the carbon content of the steel sheet beyond which there is a risk of sudden fracture in the weld metal zone is therefore 1.59.

In addition, the fact that the fracture always occurs in the base metal beyond this value of 1.27 is unexpected, because the toughness of the molten metal decreases as the carbon content increases. Coupled with the effect of stress concentrations which is unavoidable in the welded joint, the fracture should rather have occurred in the molten metal on account of a lack of toughness for the highest carbon levels.

For this purpose, the risk of sudden fracture in a weld at −50° C., as determined under the conditions specified above, was compared with the risk of sudden fracture at this same temperature in the base metal, where the base metal contained a defect in the thickness of its metal coating.

The defect in question is a micro-defect 30 μm deep corresponding to the thickness of the metal alloy coating. For a type 22MnB5 steel with the carbon content of 0.22%, the elastic limit Re is 1250 MPa. If this steel is stressed at a stress level equal to its elastic limit, the stress intensity factor $K_I$ is 13.6 MPa. √m.

By referring to this letter value in FIG. 9 under reference number 68, it can be determined that the sudden fracture should theoretically occur in the weld metal zone and not in the base metal. However, contrary to what was expected, the inventors found that when the ratio between the carbon content of the weld metal zone and the carbon content of the base metal is between 1.27 and 1.59, the fracture systematically occurs in the base metal and not in the weld metal zone. In summary, the inventors have found that the increase in the carbon content in this specific range makes it possible to increase the strength characteristics of the weld metal zone of the hot stamped part, and without any increase in the risk of sudden fracture in this zone, an altogether unexpected effect.

In addition, the inventors have sought to define a simple method to define the zone claimed by the invention on the basis of the hardness characteristics of the weld metal zone and of the neighboring base metal in the hot stamped part. The significant hardness of the weld metal zone is linked to its martensitic microstructure, which does not contain any ferrite. It is known that the hardness of a steel with a martensitic structure is principally a function of its carbon content. Consequently, it is possible to define, on the basis of the above results, the ratio Z between the hardness of the weld metal zone and the hardness of the neighboring base metal which must be respected.

In the case of the welding of sheets of different compositions, Cmax designates the carbon content of the sheet that has the highest carbon content. In the case of welding of identical sheets, Cmax designates their carbon content. A fracture in the base metal during the application of tensile stress to a welded joint occurs when the ratio Z is greater than a critical value which is a function of Cmax, i.e. 1.029+(0.36 Cmax).

For the welding of identical sheets containing 0.22% carbon, a fracture in the base metal is therefore observed when the ratio Z is greater than 1.108, i.e. when the hardness of the weld metal zone exceeds the hardness of the base metal by approximately 11%.

With reference to FIG. 7, the curves 47 and 48 represent the evolution of the microhardness in the weld metal zone and in the neighboring zones of the welded zone represented on the respective micrographs M1 and M2, for a volume percentage of filler metal of 15% and for different thicknesses of welded sheets.

For the curve 47, relative to a cooling rate of 30° C. per second, the micro hardness measurements were conducted at the level of the lateral edge of the weld metal zone at one-half the thickness of the thinnest sheet as illustrated in the micrograph M1 by the dotted line X1.

For the curve 48, relative to a cooling rate of 50° C. per second, the micro hardness measurements were conducted at the level of the bottom of the weld metal zone at one-half the thickness of the thinnest sheet as illustrated in the micrograph M2 by the dotted line X2.

With reference to FIG. 8, the preferred limit conditions in terms of percentage of filler metal and welding speed for the specific composition of filler wire defined above and containing 0.7% carbon are defined by the hatched zone 50.

This zone 50 is delimited by four boundaries 51, 52, 53, 54.

The first boundary 51 defines the lower limit of the percentage of filler metal. The percentage of filler metal must therefore be greater than 12% to keep the welded zone from exhibiting mechanical strength characteristics that are too weak.

The second boundary 52 defines the upper limit of the percentage of filler metal. The percentage of filler metal must therefore be less than 26%, because above this limit, the welded zone exhibits a brittleness which is incompatible with the required properties.

The third boundary 53 defines the lower limit of the welding speed. The welding speed must therefore be greater than 3 meters per minute to obtain a satisfactory geometry of the weld bead and to prevent oxidation phenomena.

Finally, the fourth boundary 54 defines the upper limit of the welding speed and is in the shape of a curve.

This fourth boundary 54 is defined on the basis of the experimental points 40, 41, 42 discussed above and for which the experimental points 42 correspond to specimens for which the mixing between the filler metal and the base metal is insufficient and/or the weld does not penetrate to a sufficient depth. In addition, the curved shape of this fourth boundary 54 is estimated with reference to requirements specific to the welding operation.

In fact, the capacity of the laser source to melt the filler wire and to cause a relatively homogeneous mixing has an influence on the maximum percentage of filler metal and on the welding speed.

For this purpose, for a welding speed of 4 meters per minute, for example, the percentage of filler metal must not be greater than approximately 25%.

For a higher welding speed, the proportion of filler metal must be limited.

In approximation of this fourth boundary 54, the equation of the straight line 55 that passes through a first point 56 located at the junction between the upper part of the fourth boundary 54 and the second boundary 52, and through a second point 57 located at the junction between the lower part of the fourth boundary 54 and the first boundary 51 was estimated.

The equation of this straight line 55 is $Y=3.86X+39.5$ where Y is the percentage of filler metal and X is the welding speed expressed in meters per minute.

It can therefore be assumed approximately that the fourth boundary defining the maximum limit of the welding speed is defined by the straight line 55 for a welding speed greater than 3.5 m/m.

Therefore, the invention makes it possible to economically fabricate structural and safety parts for the automobile industry.

What is claimed is:

1. A welded steel part obtained by heating in the austenitic range followed by hot forming, then cooling, of at least one welded blank obtained by a butt welding of at least a first and a second sheet comprising:
   a steel substrate; and
   a pre-coating including an intermetallic alloy layer and a metal alloy layer of an aluminum or aluminum-base alloy, the intermetallic alloy layer contacting the steel substrate, the metal alloy layer topping the intermetallic alloy layer;
   a weld metal zone resulting from the welding operation and forming a bond between the first and second sheets;
   the metal alloy layer being removed from edges peripheral to the weld metal zone while the intermetallic alloy layer remains;
   over at least a portion of the weld metal zone, a ratio between a carbon content of the weld metal zone and a carbon content of the steel substrate of the first or second sheet having a higher carbon content Cmax, is between 1.27 and 1.59;
   a composition of the steel substrate of at least the first or the second sheet, comprises the following elements, expressed in percent by weight:
   $0.10\% \leq C \leq 0.5\%$
   $0.5\% \leq Mn \leq 3\%$
   $0.1\% \leq Si \leq 1\%$
   $0.01\% \leq Cr \leq 1\%$
   $Ti \leq 0.2\%$
   $Al \leq 0.1\%$
   $S \leq 0.05\%$
   $P \leq 0.1\%$
   $0.0002\% \leq B \leq 0.010\%$,
   the balance being iron and unavoidable impurities from processing.

2. The steel part as recited in claim 1, wherein the ratio between the hardness of the welded metal zone and the hardness of the substrate of one of the first or second sheets having a higher carbon content is greater than 1.029+(0.36 Cmax), whereby Cmax is expressed in percent by weight.

3. The steel part as recited in claim 1, wherein the composition of the steel substrate of at least the first or second sheet includes the following elements, expressed in percent by weight:
   $0.15\% \leq C \leq 0.4\%$
   $0.8\% \leq Mn \leq 2.3\%$
   $0.1\% \leq Si \leq 0.35\%$
   $0.1\% \leq Cr \leq 1\%$
   $Ti \leq 0.1\%$
   $Al \leq 0.1\%$
   $S \leq 0.03\%$
   $P \leq 0.05\%$
   $0.0005\% \leq B \leq 0.010\%$,
   the balance being iron and unavoidable impurities from processing.

4. The steel part as recited in claim 1, wherein the composition of the steel substrate of at least the first or second sheet includes the following elements, expressed in percent by weight:
   $0.15\% \leq C \leq 0.25\%$
   $0.8\% \leq Mn \leq 1.8\%$
   $0.1\% \leq Si \leq 0.35\%$
   $0.01\% \leq Cr \leq 0.5\%$
   $Ti \leq 0.1\%$
   $Al \leq 0.1\%$
   $S \leq 0.05\%$
   $P \leq 0.1\%$
   $0.0002\% \leq B \leq 0.005\%$,
   the balance being iron and unavoidable impurities from processing.

5. The steel part as recited in claim 1, wherein the carbon content of the weld metal zone is less than or equal to 0.35% by weight.

6. The steel part as recited in claim 1, wherein the metal alloy layer of the pre-coating includes, expressed in percent by weight, between 8 and 11% silicon and between 2 and 4% iron, the remainder of the metal ahoy layer composition consisting of aluminum and unavoidable impurities.

7. The steel part as recited in claim 1, wherein a microstructure of the weld metal zone includes no ferrite.

8. The steel part as recited in claim 1, wherein a microstructure of the weld metal zone is martensitic.

9. The steel part as recited in claim 1, wherein hot forming of the welded blank is performed by a hot stamping operation.

10. The steel part as recited in claim 1, wherein the aluminum or aluminum alloy of the metal alloy layer is removed from respective cut edges of peripheral edges of the first and second sheets destined to undergo the welding operation.

11. The steel part as recited in claim 1, wherein the welded steel part includes a mechanical strength greater than 1230 MPa.

* * * * *